July 8, 1969    D. P. BATES    3,453,718
METHOD OF BIASING PIPE INSULATION DURING INSTALLATION
Filed Dec. 11, 1967
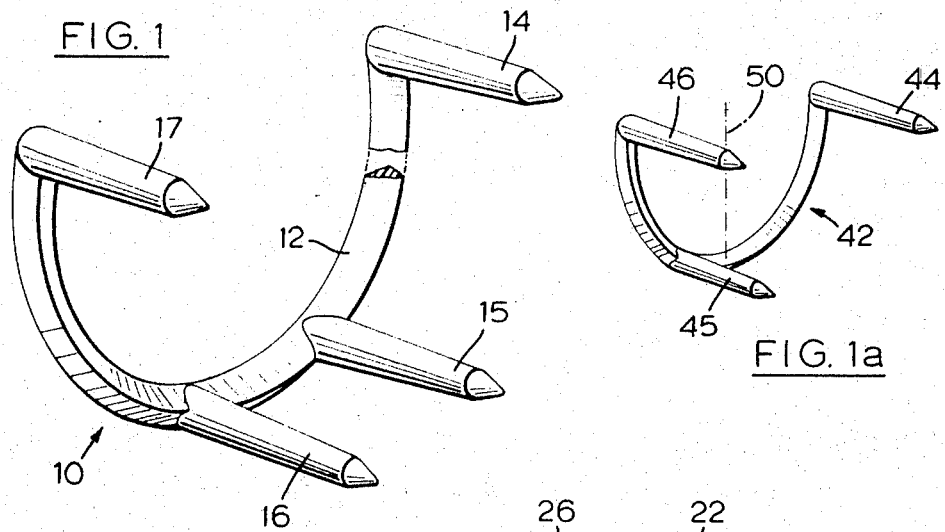
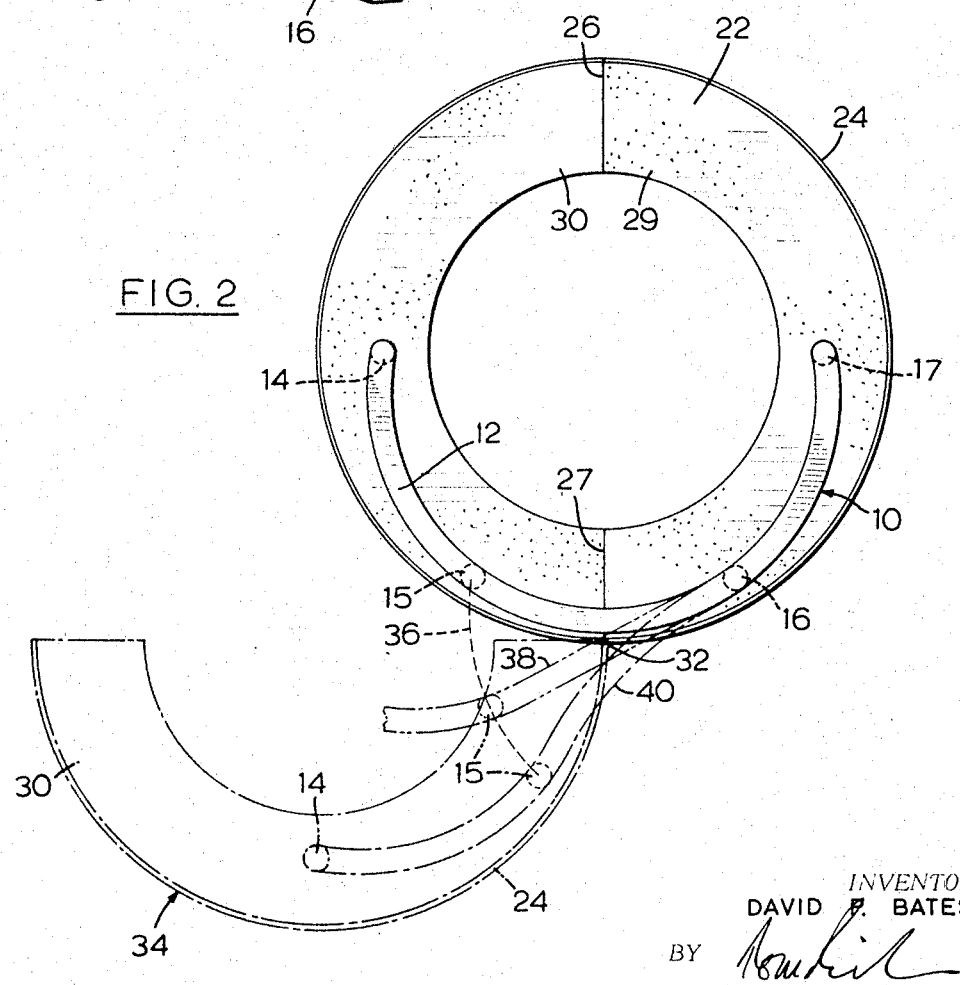
INVENTOR.
DAVID P. BATES
BY
PATENT AGENT

United States Patent Office 3,453,718
Patented July 8, 1969

3,453,718
METHOD OF BIASING PIPE INSULATION DURING INSTALLATION
David P. Bates, Buffalo Grove, Ill., assignor to Westhem Corporation Limited, Toronto, Ontario, Canada
Filed Dec. 11, 1967, Ser. No. 689,701
Int. Cl. B23p *11/00;* F16l *9/14*
U.S. Cl. 29—432
4 Claims

ABSTRACT OF THE DISCLOSURE

A biasing element consisting of a curved elongated base with four spaced, pointed prongs projecting therefrom in a common direction normal to the plane containing the curved base. In use, the biasing element is affixed to one end of a length of split cylindrical pipe insulation with two prongs inserted into each half of the split insulation. The curved base is positioned closely adjacent the outer surface of the insulation where one of the splits occurs. To permit this, the curved base has a radius of curvature smaller than the outer radius of the insulation.

---

This invention relates to a method of resiliently biasing toward the closed position a length of pipe insulation which has been split axially, the two portions being hinged together so that the length of pipe insulation can be opened out, fitted on a pipe, and closed thereon. This invention also relates to a biasing element for use with the above method.

One of the problems met with during the installation of piping in the construction industry is that of maintaining the two halves of a length of pipe insulation in the closed position around a pipe while other lengths of insulation are being applied to the pipe, prior to the wrapping of the insulation. Split pipe insulation is usually furnished in standard lengths, for example three feet, and the two halves of the insulation are usually either completely separate from each other, or are linked together by an outer skin which encloses the insulation material. In the latter case, the two halves of the pipe insulation are adapted to articulate about the point where the skin bridges across the split between the halves. The outer skin is usually a flexible sheet material, and has no biasing or spring effect to ensure that the two halves of the pipe insulation will remain closed around the pipe for the time elapsing between its application and the final wrapping of the insulation.

It is an object of this invention to provide a method by which the two halves of a length of pipe insulation can be biased toward the closed position.

It is a further object of this invention to provide a biasing element capable, when used according to the aforementioned method, of biasing the two halves of a length of pipe insulation toward the closed position.

Accordingly, this invention provides a method of resiliently biasing toward the closed position a length of hollow, cylindrical pipe insulation which is split axially at two circumferential locations into two portions, said method comprising the steps: providing a biasing element comprising an arcuate, elongated, resilient base having a radius of curvature less than the radius of the outer surface of the cylindrical insulation, the arcuate base having at least three spaced prongs projecting therefrom in a common direction normal to the plane containing said arcuate base, closing said length of pipe insulation, and affixing said biasing element to one end of the closed length of pipe insulation by inserting said prongs axially into the insulation material, the biasing element being affixed such that said arcuate base spans one of the two circumferential locations with at least one prong in each portion, the arcuate base being positioned closely adjacent the outer surface of the cylindrical insulation at said one of the two circumferential locations.

The biasing element defined above also forms part of this invention.

One embodiment of the biasing element of this invention is shown in the accompanying drawings, in which like numerals denote like parts throughout the several views, and in which:

FIGURE 1 is a perspective view of the biasing element of this invention;

FIGURE 1a is a perspective view of an alternate form of the biasing element of this invention; and FIGURE 2 is an end view of a length of split pipe insulation, in both the open and closed positions, showing the proper positioning of the biasing element of FIGURE 1.

In FIGURE 1, a biasing element shown generally at 10 is seen to comprise an arcuate, elongated base 12 from which project four spaced prongs 14, 15, 16 and 17. The prongs project from the base 12 in a direction normal to the hypothetical plane containing the arcuate base 12. The biasing element 10 is preferably molded as an integral item, and at least the base 12 must be made of a resilient material, such as polypropylene.

In FIGURE 2, pipe insulation 20 consists of a cylindrical wall 22 of insulation material, such as a bat of fibrous glass, and an outer skin or jacket 24. The bat of insulating material is split at two antipodal locations 26 and 27 into two portions 29 and 30. The portions 29 and 30 are hingedly linked together at the point 32 by virtue of the outer skin 24 which is not broken at the location 27. The two portions 29 and 30 being thus joined by the outer skin 24, it is possible for the portion 30 to pivot in the counter-clockwise direction about the point 32 into the position shown in broken lines at 34 in FIGURE 2.

It will be noted that the radius of curvature of the base 12 of the biasing element 10 is somewhat less than that of the outer skin 24.

The method of affixing the biasing element 10 to the length of pipe insulation 20 will now be described. First, the two portions 29 and 30 of the length of pipe insulation 20 are closed together into the solid line position of FIGURE 2. Next, the biasing element 10 is affixed to one end of the closed length of pipe insulation by inserting the prongs 14, 15, 16 and 17 into the insulation material 22, with the biasing element 10 in a position wherein the arcuate base 12 spans the location 27 with two of the prongs in each portion 29 and 30. It will be noted in FIGURE 2 that the base 12 is positioned inwardly of but closely adjacent the outer skin 24 at the location 27. This positioning is important for the following reason. As the portion 30 pivots in the counter-clockwise direction into the broken line position shown in FIGURE 2, the prong 15 follows the arcuate path 36, of which the centre of curvature is at the point 32. This means that the rectilinear distance between prongs 16 and 15 increases as the portion 30 begins to pivot toward the open position, is at a maximum when the line joining prongs 15 and 16 passes through the point 32, and then again decreases. Because the prongs 15 and 16 (as well as the prongs 14 and 17) are firmly embedded in the insulation material 22, it is essential that the portion of the base 12 between the prongs 15 and 16 be shaped and positioned such that it can permit the distance between the prongs 15 and 16 to increase as described above. If this increase were resisted, the prongs 15 and 16 would tear the insulating material 22, with the result that the biasing element 10 would cease to grip the length of pipe insulation 20 properly.

The shape and position of the biasing element 10 shown in FIGURE 2, however, does permit an increase in the distance between the prongs 15 and 16, because of the curvature of the base 12, and because the base 12 is positioned inwardly of but closely adjacent the point 32. It will be seen that the base 12 is substantially straightened out at the intermediate position shown in broken lines 38, where the point 32 and the prongs 15 and 16 are in alignment, and that portion of the base 12 between the prongs 15 and 16 takes on a reverse curvature as shown by broken lines 40 when the portion 30 has opened further.

It will be appreciated that if the biasing element 10 were positioned inwardly of the position shown, for example adjacent the inner circumference of the length of pipe insulation 20, the path described by the prong 15 during the counter-clockwise opening of the portion 30 would be such as to cause the distance between the prongs 15 and 16 to increase to a much greater extent than the base 12 between these prongs is capable of accommodating.

It is thus important that the base 12 be positioned adjacent the point 32. It would be possible to position the biasing element 10 such that the base were flush with the outside surface of the length of pipe insulation 20, or even slightly beyond the outside surface, although a position too far beyond the outside surface would be undesirable because the biasing element 10 could interfere with the subsequent wrapping of the pipe insulation. Furthermore, in the case of split pipe insulation joined by an outer skin, if the base of the biasing element were located appreciably beyond the outside surface of the cylindrical insulation, it would cause the base 12 to buckle in compression, which would interfere with smooth bending in the base and could cause destructive tension stresses in the outer skin. Where the halves of the split pipe insulation are not attached to one another, however, the only difficulty associated with positioning the base beyond the outer circumference would be the problem of wrapping the insulation subsequent to installation.

There are two reasons for making the radius of curvature of the base 12 smaller than the radius of the outer skin 24. Firstly, it is desirable to embed the prongs 14, 15, 16 and 17 in the insulating material 22 at locations which are not on either the outer or the inner circumference of the insulation, so that the biasing element 10 can grip the insulation properly, while at the same time permitting the base 12 to be positioned adjacent the point 32. Secondly, it may be found desirable to resiliently expand the base 12 to a slight extent before inserting the prongs 14–17 into the insulation material 22. By doing this, the biasing element 10 will exert a positive closure force on the two portions 29 and 30 when the insulation is in its closed position. However, in order to permit such a resilient expansion, the initial radius of curvature of the base 12 must be smaller than that shown in FIGURE 2, assuming that the biasing element 10 in FIGURE 2 has already been resiliently expanded before the prongs 14–17 are inserted into the insulating material 22.

FIGURE 1a shows a biasing element 42 having three prongs 44, 45 and 46, which could also be used in accordance with this invention. The base would again be positioned adjacent the point 32 (see FIGURE 2), with one prong 44 in one of the portions of insulation and the prongs 45 and 46 in the other portion. The split between the portions 29 and 30 (location 27) would lie approximately along the broken line 50 in FIGURE 1a.

It will be clear that two biasing elements could be affixed in the same manner to each length of pipe insulation, one at either end, should a single biasing element prove insufficient to achieve the required closure force.

Where the biasing element of this invention is to be applied to split pipe insulation consisting of two separate halves which are not attached together by a skin or other means, the same method is applicable. In this case it is again important to position the base of the biasing element adjacent the outer periphery of the insulation at the location where the split occurs, since, as mentioned above, a position too far inside the outer circumference will result in tearing of the insulation by the prongs, while a position too far beyond the outer circumference could interfere with subsequent wrapping of the insulation.

While a preferred embodiment of this invention has been disclosed herein, those skilled in the art will appreciate that changes and modifications may be made therein without departing from the spirit and scope of this invention as defined in the appended claims.

What I claim as my invention is:

1. A method of resiliently biasing toward the closed position a length of hollow, cylindrical pipe insulation which is split axially at two circumferential locations into two portions, said method comprising the steps:
   providing a biasing element comprising an arcuate, elongated, resilient base having a radius of curvature less than the radius of the outer surface of the cylindrical insulation, the arcuate base having at least three spaced prongs projecting therefrom in a common direction normal to the plane containing said arcuate base,
   closing said length of pipe insulation,
   and affixing said biasing element to one end of the closed length of pipe insulation by inserting said prongs axially into the insulation material, the biasing element being affixed such that said arcuate base spans one of the two circumferential locations with at least one prong in each portion, the arcuate base being positioned closely adjacent the outer surface of the cylindrical insulation at said one of the two circumferential locations.

2. A method as claimed in claim 1, in which said arcuate base has four spaced prongs, and in which the biasing element is affixed to the length of pipe insulation with two prongs in each position.

3. A method as claimed in claim 1, in which a further biasing element is provided, and in which said further biasing element is affixed to the other end of said closed length of pipe insulation in the same manner as the first-mentioned biasing element is affixed to said one end of said closed length of pipe insulation.

4. A method as claimed in claim 2, in which, prior to the step of affixing said biasing element to one end of the closed length of pipe insulation, the arcuate base is resiliently expanded slightly to give it a greater radius of curvature, such that the biasing element exerts a positive closure force on the length of pipe insulation when the latter is closed.

References Cited

UNITED STATES PATENTS

| | | | |
|---|---|---|---|
| 347,631 | 8/1886 | Merriam | 138—149 |
| 759,403 | 5/1904 | Stevenson. | |
| 2,160,009 | 5/1939 | Walker | 138—149 |
| 2,324,181 | 7/1943 | Tulien. | |
| 3,244,388 | 4/1966 | Coffman | 138—149 X |
| 3,247,559 | 4/1966 | Mathison. | |

FOREIGN PATENTS

| | | |
|---|---|---|
| 219,928 | 8/1957 | Australia. |
| 507,765 | 1/1955 | Italy. |

CHARLIE T. MOON, *Primary Examiner.*

U.S. Cl. X.R.

24—87; 29—450, 455, 463; 138—149